United States Patent [19]

White

[11] Patent Number: 4,961,114
[45] Date of Patent: Oct. 2, 1990

[54] DIGITAL MEMORY DELAY LINE FOR A VIDEO BORDER GENERATOR

[75] Inventor: Charles White, Bensalem, Pa.

[73] Assignee: The Grass Valley Group, Inc., Nevada City, Calif.

[21] Appl. No.: 328,923

[22] Filed: Mar. 27, 1989

[51] Int. Cl.$^5$ ............................................. H04N 5/262
[52] U.S. Cl. ...................................... 358/183; 358/22; 340/730
[58] Field of Search ................... 358/22, 183, 180, 31; 340/730, 729; 307/261

[56] References Cited

U.S. PATENT DOCUMENTS

| | | | |
|---|---|---|---|
| 4,214,263 | 7/1980 | Kaiser | 358/22 |
| 4,220,965 | 9/1980 | Heitmann et al. | 358/183 |
| 4,408,198 | 10/1983 | Kudirka | 340/730 |
| 4,437,092 | 3/1984 | Dean et al. | 340/730 |
| 4,485,402 | 11/1984 | Searby | 358/134 |
| 4,500,912 | 2/1985 | Bolger | 358/31 |
| 4,598,309 | 7/1986 | Casey | 358/31 |
| 4,654,711 | 3/1987 | Mikado | 358/180 |
| 4,673,983 | 6/1987 | Sarugaka et al. | 358/22 |
| 4,689,681 | 8/1987 | Jackson | 358/183 |
| 4,698,666 | 10/1987 | Lake, Jr. et al. | 340/730 |
| 4,764,809 | 8/1988 | Haycock et al. | 358/183 |

FOREIGN PATENT DOCUMENTS

| | | |
|---|---|---|
| 0268360 | 5/1988 | European Pat. Off. . |
| 54-52412 | of 1979 | Japan . |
| 0011376 | 1/1987 | Japan . |
| 0276978 | 11/1988 | Japan . |

Primary Examiner—John W. Shepperd
Assistant Examiner—James Juo
Attorney, Agent, or Firm—Francis I. Gray

[57] ABSTRACT

A digital memory delay line for a video border generator digitizes an insert video key signal and stores the digitized key signal in a digital memory. The locations in the memory are addressed sequentially in a continuous cycle so that as each location is addressed the portion of the key signal stored there is read out to reconstruct the key signal delayed by the cycle time, and a new portion of the key signal is written in. A clock for an address counter that provides addresses for access to the memory has a frequency that is a function of the number locations in the memory and the desired delay of the key signal. The delayed key signal from the memory is written back into the memory in parallel with the current key signal to provide a second output that is delayed by an additional address sequence cycle. The result is to reproduce the insert video key signal delayed for one horizontal line interval and for two horizontal line intervals. From the delayed key signals and the insert video key signal, a widened key signal is generated that is used by the video border generator to mix an insert video having a desired border effect with a background video.

15 Claims, 4 Drawing Sheets

DIGITAL MEMORY DELAY LINE FOR A VIDEO BORDER GENERATOR

BACKGROUND OF THE INVENTION

The present invention relates to video key processing, and more particularly to a digital memory delay line for a video border generator that produces a widened key signal for border or shadow effects about a title video signal.

A video border generator provides a border or a shadow for a video image signal. To produce such a border or shadow a widened key signal is generated from an input key signal associated with the video image signal. The input key signal is subtracted from the widened key signal to produce a fill key signal that permits the addition of a border or shadow video fill signal to the video image signal. One such video border generator is incorporated into the Model 100 Video Switcher manufactured by The Grass Valley Group, Inc. of Grass Valley, Calif., United States of America. The input key signal is input to an input buffer amplifier, and then applied to a series of delay lines, each delay line having a delay equal to one horizontal video line. The outputs of the delay lines together with the input key signal are input to a combinational logic and output circuit to produce the widened key signal according to the desired mode determined by a command signal. These delay lines are analog glass delay lines that require complementary inputs. The delay lines produce a bipolar doublet output that is delayed from the input by approximately one horizontal line (1H). The doublet is compared with two thresholds, setting respective flip-flops to form a pulse identical with the key input timing. An additional delay line is used having taps to finely adjust the 1H delay for each glass delay line. This analog system is expensive and subject to errors typical of analog devices.

What is desired is a device for producing a precise 1H and 2H delay of an input key signal for a border/shadow generator without the expense of analog delay devices with their attendant errors.

SUMMARY OF THE INVENTION

Accordingly the present invention provides a digital memory delay line for a video border generator having a digital memory that is clocked cyclically at a rate so that data input is accessed again approximately one horizontal line interval later to produce a 1H delay. By taking the output of the digital memory and reading it back into the digital memory, a 2H delay is produced. An input key signal is sampled on alternate cycles of a clock signal to produce a binary pair of data bits. The clock signal also clocks an address counter that cycles through a predetermined number of addresses. The binary pair is loaded into the digital memory and subsequently read out approximately one horizontal line interval later. The data is demultiplexed to reproduce the input key signal, and also is loaded back into the digital memory for subsequent readout another horizontal line interval later. The input key signal delayed by the digital memory is then delayed for a few pixel elements and combined with the input key signal to provide a key signal that is widened in each direction. The widened key signal is used to generate border and shadow effects.

The objects, advantages and novel features of the present invention are apparent from the following detailed description when read in conjunction with the appended claims and attached drawing.

DESCRIPTION OF THE PREFERRED EMBODIMENT

Figure 1:
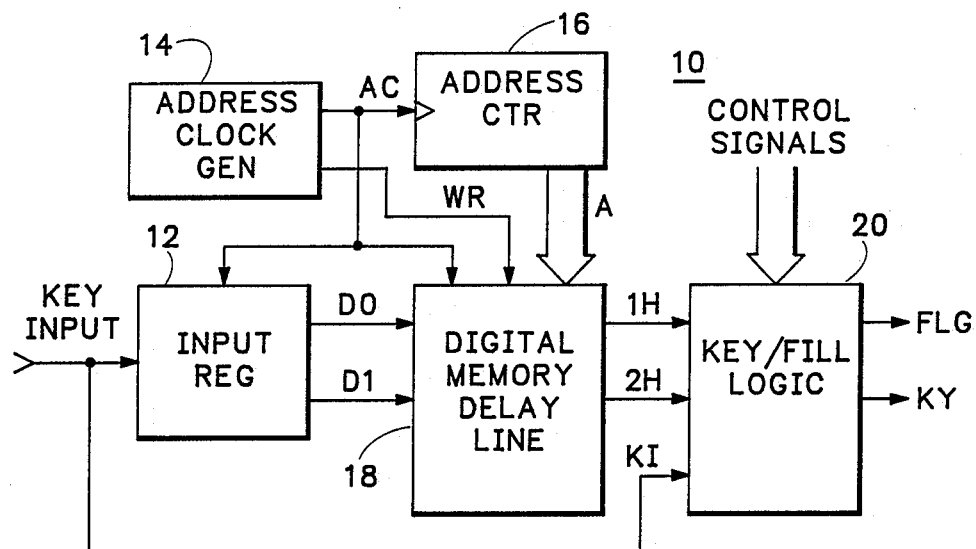
FIG. 1 is a block diagram view of a digital memory delay line for a video border generator according to the present invention.

Referring now to FIG. 1 a key channel 10 for a border generator is shown that receives a key input signal KI and outputs a widened key signal KY. The key input signal KI is a hard or digital key signal having a value of either zero or one, and is input to a key input register 12. Also input to the key input register 12 is an address clock signal AC from an address clock generator 14. The address clock signal AC is input to the key input register 12 to sample the key input signal KI to produce a two-bit output signal D0, D1 representing two samples of the key input signal. The address clock signal AC also is input to an address counter 16 that is a recirculating counter that continuously counts the pulses of the address clock signal to produce an address incrementing from zero to x, where $x = 2^n - 1$ and n is the number of bits of the counter, and then restarting again at zero.

The addresses A from the address counter 16, together with the address clock signal AC and a write signal WR from the address clock generator 14, are applied to a digital memory delay line 18, which is described in greater detail subsequently. Also input to the digital memory delay line 18 is the two-bit output D0, D1 from the key input register 12. Thus for each clock pulse AC a new two-bit output D0, D1 is generated and stored in the next address of the digital memory delay line 18 in response to the write pulse WR. The digital memory delay line 18 provides the data stored in the delay line as an output signal either one horizontal line interval later (1H) or two horizontal line intervals later (2H). The output signals 1H, 2H together with the key input signal KI are input to a key/fill logic circuit 20 that combines the inputs in response to specified control signals to produce the widened key and a border insert flag related to the widened key.

Figure 2A:
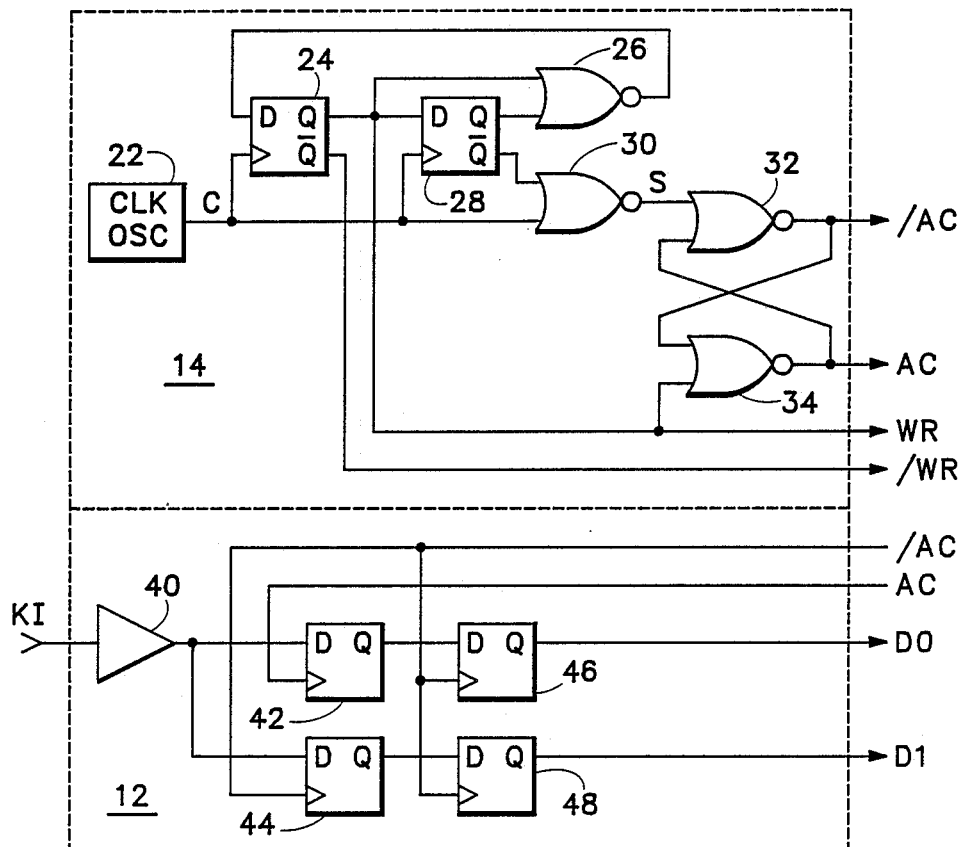
FIGS. 2a and 2b form a schematic diagram view of the digital memory delay line of FIG. 1.

As shown in FIG. 2a the address clock generator 14 has a clock oscillator 22, such as a crystal oscillator having good stability. The output C of the clock oscillator 22 is input to clock a first D-type flip-flop, or latch, 24 that produces the write signals WR, /WR at the Q, /Q outputs respectively. The write signal WR is input to a first NOR gate 26 and to a second D-type flip-flop 28, the Q output of which is also input to the first NOR gate. The second flip-flop also is clocked by the clock signal C. The output of the first NOR gate 26 is input to the D input of the first flip-flop 24. The /Q output of the second flip-flop 28 is input, together with the clock signal C, to a second NOR gate 30 to produce an intermediate clock signal S having a frequency one-third of that of the clock signal. Thus the two flip-flops 24, 28 and the two NOR gates 26, 30 act as a divide by three circuit. The write signal WR and the intermediate clock signal S are input to respective ones of a pair of NOR gates 32, 34 that are cross connected to form a latch, the outputs of which are the symmetrical address clock signals AC, /AC.

The key input signal KI is first buffered and level shifted, as necessary, by a buffer amplifier 40. The output of the buffer amplifier 40 is input in parallel to the D inputs of a pair of D-type flip-flops 42, 44 that are clocked respectively by the AC and /AC address clock signals so that the value S0 of the key input signal at time T0 is stored in the first flip-flop 42, while the value S1 of the key input signal at time T1 is stored in the second flip-flop 44. At time T2 the outputs from the first pair of flip-flops is clocked by the AC signal into a second pair of flip-flops 46, 48, the outputs of which form the two-bit data word D0, D1.

Figure 2B:
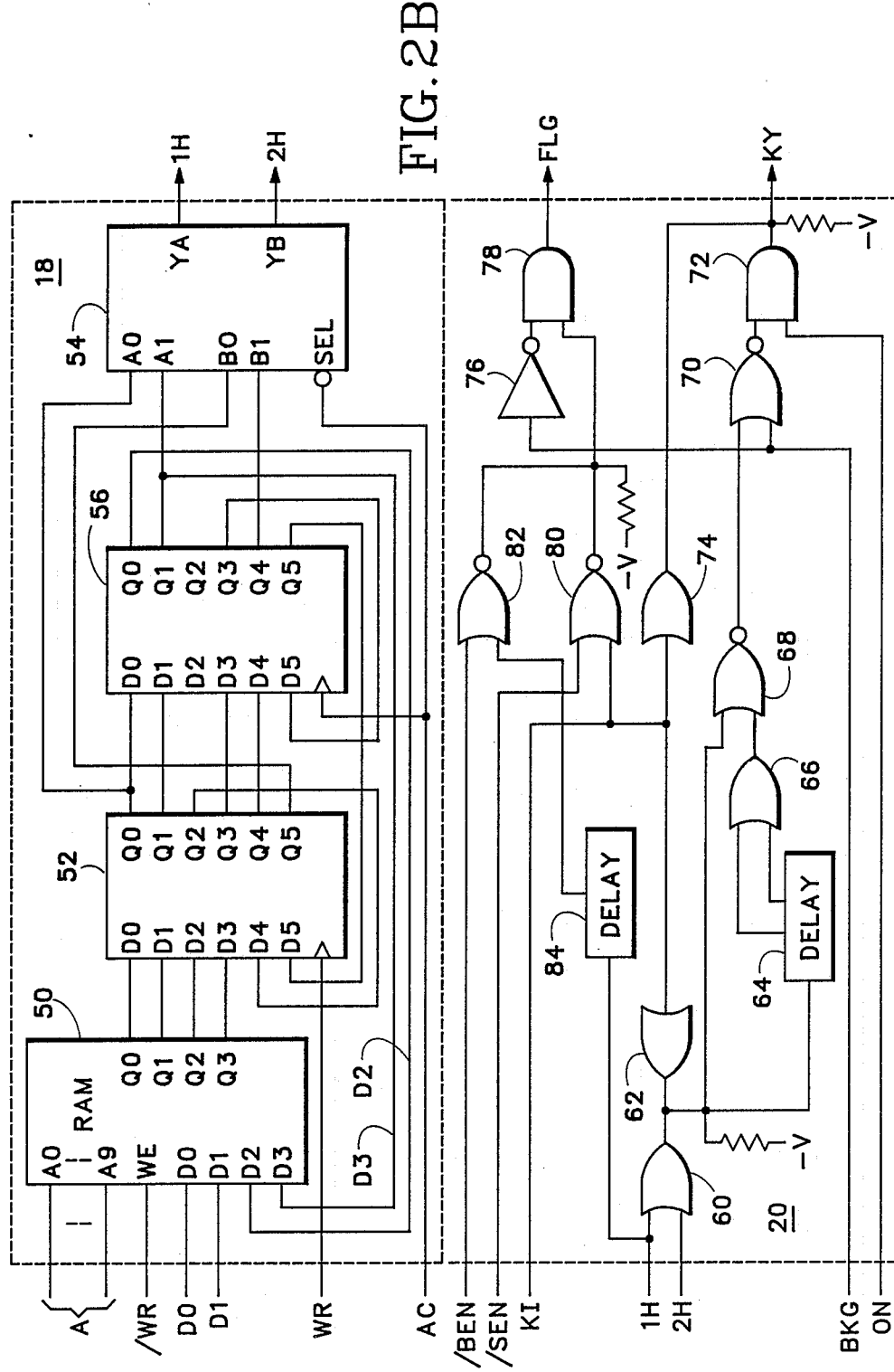

The basic digital delay device of the present invention, as shown in FIG. 2b, is a digital random access memory (RAM) 50 having $2^n$ memory locations with p bits per word. For the purposes of the present description, p=4 to produce a maximum delay of two horizontal line intervals. The two-bit data word D0, D1 from the key input register 12 and a second two-bit data word D2, D3, the derivation of which is described below, are stored in the digital RAM 50 at the address indicated by the address count A from the address counter 16 when the /WR signal enables the RAM to receive data. The corresponding output terminals Q0-Q3 of the RAM 50 are input to the D0-D3 inputs of an output register 52 that is clocked by the WR signal to transfer the data from the RAM. The Q0 output of the output register is input to one terminal A0 of an output demultiplexer 54 and to the D0 input of a delay register 56 that is clocked by the AC signal. The Q1 output of the output register 52 is input to the D1 input of the delay register, the Q1 output of which is input to the A1 terminal of the output demultiplexer 54. The Q0, Q1 outputs of the delay register 56 form the second two-bit data word D2, D3 that is applied to the input of the RAM 50.

The Q2 output of the output register 52 is fed back to the D4 input, and the Q3 and Q4 outputs are input to the D3 and D4 inputs of the delay register 56. The Q3 output of the delay register 56 is fed back to the D5 input, and the Q4 output is input to the B1 terminal of the output demultiplexer 54. The Q5 output of the delay register 56 is fed back to the D5 input of the output register 52, the Q5 output of which is input to the B0 terminal of the output demultiplexer 54. The outputs YA, YB of the output demultiplexer 54 are the key input signal delayed, respectively, by one horizontal line interval 1H and two horizontal line intervals 2H. The AC signal is applied to the select input of the output demultiplexer 54 to switch between the A0, B0 and A1, B1 inputs to produce the YA, YB outputs.

The 1H, 2H key signals from the digital memory delay line 18 and the key input signal KI are combined by OR gates 60, 62 to produce a key signal that has been increased in vertical width by two horizontal lines. The vertically widened key signal is input to a first delay line 64 to widen the key signal horizontally by a predetermined amount, such as 300 nsecs. Multiple taps of the first delay line 64 are input to an OR gate 66 to prevent a notched 300 nsec key signal from occurring if the key input signal is narrower than 300 nsec. The horizontally delayed key signal from the OR gate 66 is combined with the vertically widened key signal in a NOR gate 68 to produce the widened key signal. The widened key signal is then combined in another NOR gate 70 with a blanking key signal BKG to output the widened key signal only where there is an insert video signal, i.e., no key action desired in horizontal or vertical blanking intervals. The widened key signal is then input to an output AND gate 72 that passes the widened key signal as an output key signal KY when enabled by an ON signal. Also part of the output key signal KY is the key input key signal KI via gate 74 acting as a buffer. Therefore, if the border generator is ON, the output key signal KY is the widened key signal, and if the border generator is OFF, the output key signal is the key input signal KI.

The remaining portion of the key/fill logic circuit 20 is for generating a border insert flag FLG for the border generator to notify the border generator whether the border video is inserted instead of the key "fill" video at the last 300 nsec. of the key signal for a shadow effect, or at the first 150 and last 150 nsecs. of the key signal for a border effect. The blanking key signal is inverted by a gate 76 acting as an inverter, and then input to a flag AND gate 78. A shadow control signal /SEN is input to a shadow NOR gate 80 together with the key input signal KI to provide the key input signal to the flag gate 78 to produce a shadow flag that provides border instead of fill video for the last two lines and last 300 nsec. of each line of the output key signal KY. A border control generator signal /BEN is input to a border NOR gate 82 together with the 1H key signal that is delayed for 150 nsec. by a second delay line 84 to produce a border flag that provides fill video for the first and last lines and the first and last 150 nsec. of the output key signal KY. Thus, the combination of the output key signal KY and the flag signal FLG in a border generator produces the desired shadow/border effect around a fill video image being inserted into a background video image.

Figure 3A:
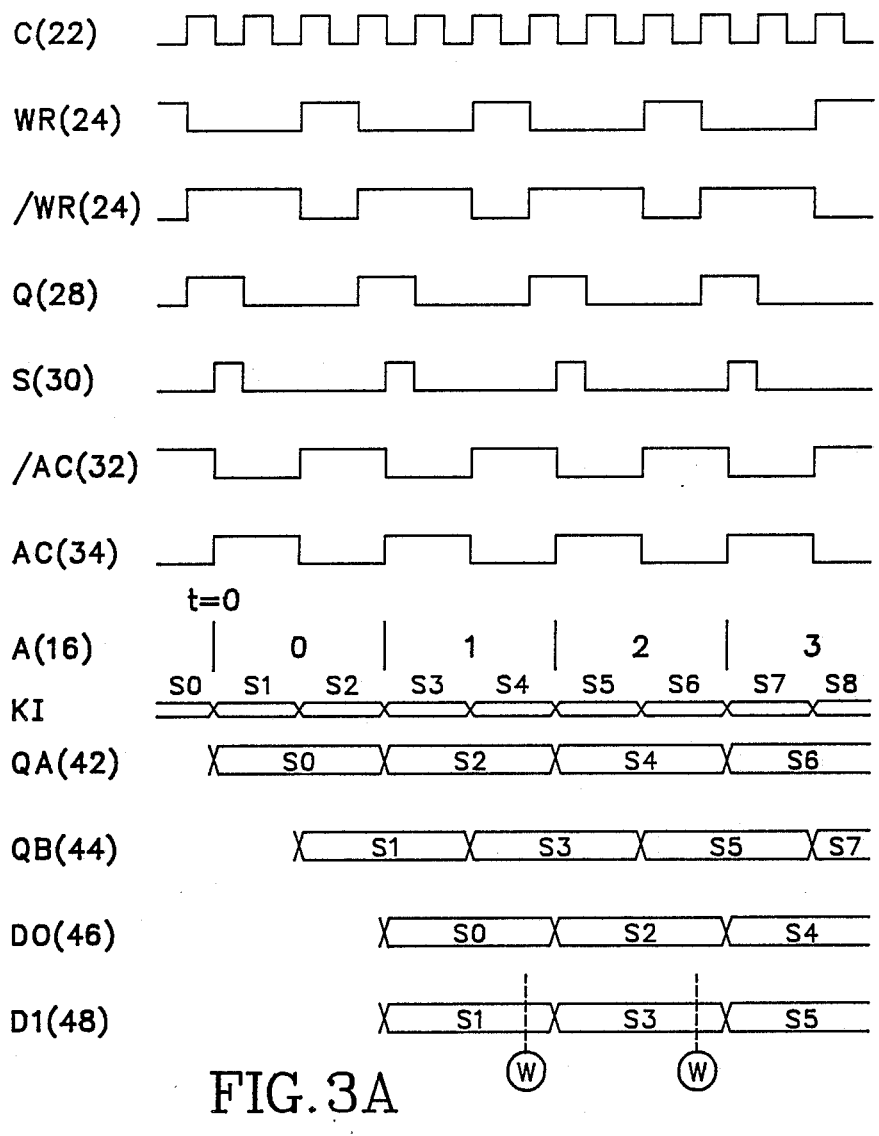
FIGS. 3a and 3b form a timing diagram for the digital memory delay line of FIG. 2.
Figure 3B:
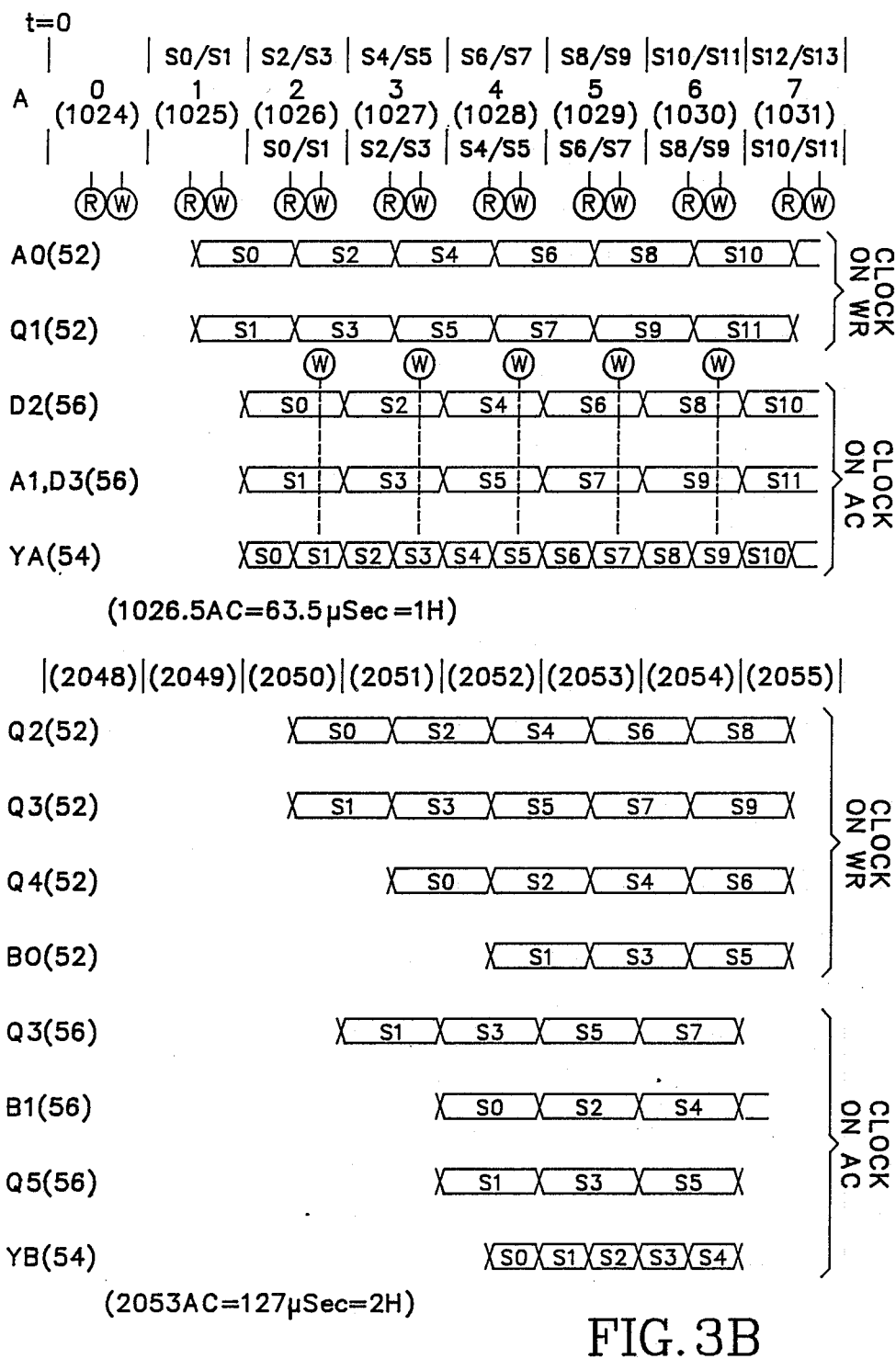

The operation of the digital memory delay line is best understood with reference to the timing diagrams of FIGS. 3a and 3b. The clock signal C from the oscillator 22 causes the output of the first flip-flop 24 to reflect the input. If the input is initially zero at the D input, then at the positive edge of C the Q output (WR) goes to zero. At the next clock edge the Q output of the second flip-flop 28 goes to zero, applying a second zero input to NOR gate 26 to produce a one at the output that is applied to the input of the first flip-flop 24. At the third clock edge the Q output of the first flip-flop 24 goes to one while the Q output of the second flip-flop 28 stays at zero. The one input to NOR gate 26 places a zero at the input to the first flip-flop 24 so that the next clock pulse starts the cycle over again. When both the /Q output of the second flip-flop is zero and the clock pulse is zero, the intermediate signal S is one and is used together with the write signal WR to trigger the address clock latch 32, 34 to produce the address clock signals AC, /AC.

At time T0 the leading edge of the AC signal causes flip-flop 42 to latch onto the current value S0 of the key input signal that existed before time T0, while at time T1 at the trailing edge of the AC signal, the leading edge of the /AC signal, flip-flop 44 latches onto the next value S1 of the key input signal. The values of S0 and S1 are then transferred to the output of the second pair of flip-flops 46, 48 at the next leading edge of the AC signal at time T2. Assuming that the address counter 16 at time T0 had cycled to its first address at location zero, then at time T2 the next address location is counted at location one. Before the next leading edge of the AC signal, the /WR signal causes the contents of the second pair of flip-flops 46, 48 to be stored at location one, bit positions D0, D1 of the RAM 50.

At the next occurrence of location one, equivalent to a complete cycle of the RAM addresses where the number of locations is 1024 in this embodiment, the values of S0, S1 are transferred from the RAM 50 to the output register 52 by the WR signal. The writing (W) the RAM 50 occurs after the reading (R) so that the data is safely transferred from the RAM location to the output register 52 before new data is written into the same location. At the next leading edge of AC the data from the output register 52 is transferred to the delay register 56, and then stored back into the next RAM location at the next leading edge of /WR. Thus S0, S1 are rewritten from location one of the RAM 50 to location two, bit positions D2, D3. At the trailing edge of the AC signal data is transferred by the output demultiplexer 54 to the 1H output terminal YA, and at the leading edge the S1 data is transferred to the 1H output to recreate the key input signal delayed by 1026.5 cycles of the AC signal. The period of AC is determined by the oscillator frequency of C and the television standard being used, i.e., NTSC, PAL-M, PAL-I, etc. For the NTSC system an oscillator frequency of 48.453665 MHz produces a period of 63.5 usec. after 1026.5 cycles of the AC signal, which is equal to one horizontal line interval. The approximately 48 MHz clock signal C produces an approximately 16 MHz AC signal that samples the key input signal KI at approximately 32 MHz.

When location two of the RAM 50 is addressed next the values of S0, S1 are transferred to the output register 52 at the leading edge of the WR signal to appear at the Q2, Q3 outputs. S0 is fed back to the Q4 output at the next WR pulse while S1 is transferred to the delay register 56 at the next AC pulse. At the subsequent AC pulse S0 is transferred to the B1 input of the output demultiplexer 54 while S1 is fed back to appear at the Q5 output. The YB output of the output demultiplexer 54 then provides a reproduction of the key input signal delayed by two horizontal line intervals in response to the selection by the AC signal. Again for NTSC the delay of 2053 AC signal periods equates to 127 usec., or two horizontal line intervals.

Thus the present invention provides a digital memory delay line for a video border generator that produces a widened key signal to allow fill video to produce shadow/border effects by using a recirculating $p \times 2^n$ digital memory that, together with an output register and a delay register, delays the key input signal by exactly one and two horizontal line intervals. When combined with each other and the key input signal under appropriate control commands, a widened key signal and a border insert flag are produced to insert a fill video insert image with a shadow/border effect into a background video image.

What is claimed is:

1. An apparatus for delaying a key signal comprising:
   means for sampling the key signal to form m-bit data words, each bit representing one sample of the key signal;
   means for delaying the m-bit data words by a predetermined time; and
   means for demultiplexing the delayed m-bit data words to reproduce the key signal delayed by the predetermined time.

2. An apparatus as recited in claim 1 wherein the sampling means comprises:
   means for latching samples of the key signal at m phases of a clock signal; and
   means for combining the samples from the latching means to produce the m-bit data word.

3. An apparatus as recited in claim 1 wherein the delaying means comprises:
   means for cyclically generating a sequence of addresses;
   means for storing the m-bit data words in a sequence of locations corresponding to the sequence of addresses; and
   means for extracting from the storing means the m-bit data words during the next cycle of the sequence of addresses prior to storing new m-bit data words into the storing means on the same cycle, the predetermined time being a function of the period of the address sequence cycle.

4. An apparatus as recited in claim 3 wherein the storing means comprises a memory having as inputs the m-bit data word and a write signal, and having as an output the delayed m-bit data word.

5. An apparatus as recited in claim 4 wherein the extracting means comprises:
   an output register having the delayed m-bit data word from the memory and the write signal as inputs and the delayed m-bit data word as an output, the delayed m-bit data word being latched to the output of the output register on one phase of the write signal, and a new m-bit data word being stored in the same location in the memory on the opposite phase of the write signal; and
   a delay register having the delayed m-bit data word from the output register and a clock signal as inputs and the delayed m-bit data word as an output.

6. An apparatus as recited in claim 5 wherein the extracting means further comprises means for feeding back the delayed m-bit data word from the delay register to the input of the memory for storage at the next location with a new m-bit data word from the sampling means, the output register latching to the output the delayed m-bit data word delayed again by the predetermined period of time to produce a second delayed m-bit data word, the output register and delay register being interconnected to each other to provide additional delay for the second delayed m-bit data word to compensate for the sampling time of the original m-bit data word, the delayed m-bit data word and the second delayed m-bit data word forming respective inputs to the demultiplexing means.

7. An apparatus for generating from a key signal a widened key signal for a video border generator comprising:
   means for sampling the key signal to form m-bit data words, each bit representing one sample of the key input signal;
   means for delaying the m-bit data words by a predetermined time;
   means for demultiplexing the delayed m-bit data words to reproduce the key signal delayed by the predetermined time; and
   means for combining the delayed key signal and the key signal to produce the widened key signal for use by a video switcher to insert a video image with a border effect into a background video image.

8. An apparatus as recited in claim 7 wherein the sampling means comprises:

means for latching samples of the key signal at m phases of a clock signal; and means for combining the samples from the latching means to produce the m-bit data word.

9. An apparatus as recited in claim 7 wherein the delaying means comprises:

means for cyclically generating a sequence of addresses;

means for storing the m-bit data words in a sequence of locations corresponding to the sequence of addresses; and means for extracting from the storing means the m-bit data words during the next cycle of the sequence of addresses prior to storing new m-bit data words into the storing means on the same cycle, the predetermined time being a function of the period of the address sequence cycle.

10. An apparatus as recited in claim 9 wherein the storing means comprises a memory having as inputs the m-bit data word and a write signal, and having as an output the delayed m-bit data word.

11. An apparatus as recited in claim 10 wherein the extracting means comprises:

an output register having the delayed m-bit data word and the write signal as inputs and the delayed m-bit data word as an output, the delayed m-bit data word being latched to the output of the output register on one phase of the write signal, and a new m-bit data word being input to the same location in the memory on the opposite phase of the write signal; and a delay register having the delayed m-bit data word from the output register and a clock signal as inputs and the delayed m-bit data word as an output.

12. An apparatus as recited in claim 11 wherein the extracting means further comprises means for feeding back the delayed m-bit data word to the input of the memory for storage at the next location with a new m-bit data word from the sampling means, the output register latching to the output the delayed m-bit data word delayed again by the predetermined period of time to produce a second delayed m-bit data word, the output register and delay register being interconnected to each other to provide additional delay for the second delayed m-bit data word to compensate for the sampling time of the original m-bit data word, the delayed m-bit data word and the second delayed m-bit data word forming respective inputs to the demultiplexing means.

13. An apparatus as recited in claim 7 wherein the combining means comprises:

means for combining the delayed key signal with the key signal to produce a vertically widened key; and means for horizontally delaying the vertically widened key to produce the widened key.

14. An apparatus for generating from a key signal a delayed key signal comprising:

a first pair of flip-flops having as input the key signal, the flip-flops being triggered respectively by opposite phases of a clock signal to latch two samples of the key signal to the respective outputs;

a second pair of flip-flops having the respective outputs of the first pair of flip-flops as respective inputs, the second pair of flip-flops being triggered by one phase of the clock signal to transform the two samples into a parallel two-bit word;

a memory having as inputs the parallel two-bit word and a write signal derived from the clock signal, the parallel two-bit word being stored in a specified location of the memory on one phase of the write signal, the specified location being addressed cyclically at a predetermined time interval;

an output register having as inputs the parallel two-bit word from the memory, delayed by the predetermined time interval, and the write signal, the delayed two-bit word being latched to the output of the output register on the opposite phase of the write signal, the opposite phase occurring prior to the one phase;

a delay register having the delayed two-bit word from the output register and the clock signal as inputs, the clock signal latching to the output on the one phase the delayed two-bit word as a second two-bit word; and a demultiplexer having one bit from the delayed two-bit word from the output register and one bit from the second two-bit word from the delay register as inputs, and in response to the clock signal reproducing the key signal from the bits as the delayed key signal.

15. An apparatus as recited in claim 14 further comprising means for feeding back the second two-bit word to the memory for input in parallel with the two-bit word from the second pair of flip-flops at the next location after the specified location, the output register having the second two-bit word delayed by the predetermined period of time latched to the output with the delayed two-bit word to produce a second delayed two-bit word, the output and delay registers being interconnected to additionally delay the second delayed two-bit word to compensate for the delay from the input to the first pair of flip-flops to the output from the second pair of flip-flops of the original two-bit word, one bit of the delayed two-bit word being taken from each of the registers after the additional delay for input to the demultiplexer to reproduce the key input signal as a second delayed key signal.

* * * * *